(12) United States Patent
Raker et al.

(10) Patent No.: US 8,306,382 B2
(45) Date of Patent: Nov. 6, 2012

(54) METHODS, CLEAVERS, AND PACKAGINGS FOR CLEAVING AN OPTICAL FIBER USING AN ABRASIVE MEDIUM

(75) Inventors: Joshua D. Raker, Lewisville, TX (US); Greg J. Scherer, Keller, TX (US)

(73) Assignee: Corning Cable Systems LLC, Hickory, NC (US)

( * ) Notice: Subject to any disclaimer, the term of this patent is extended or adjusted under 35 U.S.C. 154(b) by 246 days.

(21) Appl. No.: 12/697,604

(22) Filed: Feb. 1, 2010

(65) Prior Publication Data

US 2011/0188829 A1 Aug. 4, 2011

(51) Int. Cl.
*G02B 6/00* (2006.01)
*B26F 3/00* (2006.01)

(52) U.S. Cl. .......................................... 385/135; 225/2
(58) Field of Classification Search ................... 385/88, 385/134, 147; 225/2, 96, 96.5
See application file for complete search history.

(56) References Cited

U.S. PATENT DOCUMENTS

| | | | |
|---|---|---|---|
| 4,643,520 A | | 2/1987 | Margolin ................... 350/96.2 |
| 4,674,833 A | | 6/1987 | Des Forges et al. ....... 350/96.21 |
| 5,351,333 A | * | 9/1994 | Chambers ................... 385/134 |
| 5,359,690 A | * | 10/1994 | Kaizu et al. ................ 385/134 |
| 5,408,558 A | | 4/1995 | Fan ............................ 385/80 |
| 5,563,974 A | | 10/1996 | Carpenter et al. ............ 385/85 |
| 5,812,718 A | * | 9/1998 | Carpenter et al. ............ 385/97 |
| 6,510,271 B1 | * | 1/2003 | Beldycki ..................... 385/134 |
| 6,628,879 B2 | * | 9/2003 | Robinson et al. ............ 385/134 |
| 6,695,191 B1 | * | 2/2004 | Tabeling ....................... 225/95 |
| 7,391,951 B2 | * | 6/2008 | Hayashi et al. ............. 385/134 |
| 7,454,117 B2 | * | 11/2008 | Carpenter et al. .......... 385/137 |
| 7,805,045 B2 | * | 9/2010 | Watte et al. ................ 385/136 |
| 8,254,739 B2 | * | 8/2012 | Bylander et al. ............ 385/134 |
| 2011/0204116 A1 | * | 8/2011 | Barnes et al. ................. 225/2 |

FOREIGN PATENT DOCUMENTS

| | | |
|---|---|---|
| SU | 920012 A1 | 4/1982 |
| WO | WO01/27671 A1 | 4/2001 |
| WO | WO2009/051918 A1 | 4/2009 |

OTHER PUBLICATIONS

Patent Cooperation Treaty, International Search Report and Written Opinion, Jul. 18, 2011, 10 pages.

* cited by examiner

*Primary Examiner* — Akm Enayet Ullah

(57) ABSTRACT

Methods, cleavers, and packagings for cleaving an optical fiber using an abrasive medium are disclosed. The abrasive medium may be placed into contact with an optical fiber to induce a flaw in the optical fiber. The optical fiber is broken about the induced flaw to create an end face for fiber optic termination preparations. In one embodiment, a method for cleaving an optical fiber without employing a blade is provided. The method includes providing an optical fiber. A flaw is created in a portion of the optical fiber using a bladeless cleaver comprised of a body and a cleaver structure attached to the body. The cleaver structure is configured to actuate to place an abrasive medium in contact with the portion of the optical fiber to create a flaw in the optical fiber. The method further includes breaking the optical fiber at the flaw to create an end face.

36 Claims, 14 Drawing Sheets

METHODS, CLEAVERS, AND PACKAGINGS FOR CLEAVING AN OPTICAL FIBER USING AN ABRASIVE MEDIUM

BACKGROUND

1. Field of the Disclosure

The technology of the disclosure relates to cleaving optical fibers to provide an end face on the optical fibers for fiber optic termination preparations.

2. Technical Background

Optical fibers can be used to transmit or process light in a variety of applications. Benefits of optical fiber include extremely wide bandwidth and low noise operation. Because of the advantages, optical fiber is increasingly being used for a variety of applications, including but not limited to broadband voice, video, and data transmission. Fiber optic networks employing optical fiber are being developed and used to deliver voice, video, and data transmissions to subscribers over both private and public networks. These fiber optic networks often include separated connection points linking optical fibers to provide "live fiber" from one connection point to another connection point. In this regard, fiber optic equipment is located in data distribution centers or central offices to support interconnections.

Optical communication networks involve termination preparations to establish connections between disparate optical fibers. For example, optical fibers can be spliced together to establish an optical connection. Optical fibers can also be connectorized with fiber optic connectors that can be plugged together to establish an optical connection. In either case, it may be necessary for a technician to establish the optical connection in the field. The technician cleaves the optical fiber to prepare an end face on the optical fiber. The technician may employ a cleaver that includes a blade to score, scribe, or otherwise induce a flaw in the glass of the optical fiber. Inducing a flaw in the glass of an optical fiber precedes breaking the glass at the flaw to produce an end face. The blade may either by pressed into the glass or swiped across the glass to induce the flaw. The end face can then either be spliced to another optical fiber or connectorized with a fiber optic connector to establish an optical connection.

Conventional cleaver blades are expensive. Conventional cleaver blades may employ an expensive hardened material(s), including diamond, sapphire, ruby, ceramics, steel, and carbide, as examples. Further, the conventional cleaver blade needs to include an extremely sharp edge to minimize the size of the flaw induced in the glass to reduce risk of damaging the core of the optical fiber to provide efficient light transfer. Providing a sharp edge on the conventional cleaver blade adds cost. Inducing a large flaw in the glass may create a poor end face. Maintenance must be provided to keep the conventional cleaver blade sharp.

SUMMARY OF THE DETAILED DESCRIPTION

Embodiments disclosed in the detailed description include methods, cleavers, and packagings for cleaving an optical fiber using an abrasive medium. The abrasive medium may be placed into contact with a portion of an optical fiber to induce a flaw in the portion of the optical fiber. The optical fiber is broken about the induced flaw to create an end face for fiber optic termination preparations. Cleaving the optical fiber prepares an end face on the optical fiber to prepare fiber optic terminations, including in the field. In this manner, the cost of the cleaver may be reduced by employing the abrasive medium. The abrasive medium may be sufficiently inexpensive to be disposable as opposed to maintaining a blade. The abrasive medium may also be disposed on a flexible carrier that allows the abrasive medium to be employed in flexible manners and cleaver form factors and/or packagings.

In this regard, in one embodiment, a method for cleaving an optical fiber without employing a conventional blade is disclosed. The method includes providing an optical fiber. A flaw is created in a portion of the optical fiber using a bladeless cleaver comprised of a body and a cleaver structure attached to the body, wherein the cleaver structure is comprised of an actuator configured to actuate with respect to the body to place an abrasive medium disposed in an abrasive medium structure disposed in the cleaver structure in contact with the portion of the optical fiber to create a flaw in the portion of the optical fiber. Thus, the method does not include a conventional blade to cleave the optical fiber. The method further includes breaking the optical fiber at the flaw to create a cleaved end face on the optical fiber.

In another embodiment, a bladeless cleaver for cleaving an optical fiber is disclosed. The bladeless cleaver includes a body and a guide surface disposed in the body to guide a portion of an optical fiber. The bladeless cleaver also includes a cleaver structure attached to the body and comprising an abrasive medium structure configured to support an abrasive medium. The cleaver structure further includes an actuator configured to actuate with respect to the body to place the abrasive medium in contact with the portion of the optical fiber to create a flaw in the portion of the optical fiber.

In another embodiment, a fiber optic package is disclosed. The fiber optic package includes an enclosure having a plurality of compartments each configured to hold a fiber optic component. A cleaver is disposed in one of the plurality of compartments, wherein the cleaver includes a guide surface configured to guide a portion of an optical fiber. An opening is disposed through the enclosure and aligned with at least a portion of the guide surface, and is configured to receive the portion of the optical fiber and dispose the portion of the optical fiber along the guide surface. The cleaver in this embodiment may include a conventional blade or be a bladeless cleaver.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include methods, cleavers, and packagings for cleaving an optical fiber using an abrasive medium. The abrasive medium may be placed into contact with a portion of an optical fiber to induce a flaw in the portion of the optical fiber. The optical fiber is broken about the induced flaw to create an end face for fiber optic termination preparations. Cleaving the optical fiber prepares an end face on the optical fiber to prepare fiber optic terminations, including in the field.

An abrasive medium for cleaving an optical fiber is more economical than a conventional cleaver blade. An abrasive medium for cleaving an optical fiber may cost on the order of cents, whereas conventional cleaver blades can cost tens of dollars up to a hundred dollars as an example. By employing a less expensive abrasive medium, costs associated with maintaining a sharp edge on a cleaver blade to avoid inducing a large flaw in an optical fiber are avoided. Consequently, with the cleavers and methods disclosed it is financially feasible to dispose and replace a used abrasive medium in the cleaver with a new abrasive medium after a few uses. For example, the abrasive medium may be disposed and replaced after ten (10) to twenty (20) cleaves. Use of an abrasive medium to cleave an optical fiber may also allow smaller form factors of optical fiber cleavers over use of conventional cleaver blades. The abrasive medium may be disposed on a rigid or flexible member. If the abrasive medium is disposed on a flexible member, the abrasive medium may be easily disposed and replaceable in a variety of cleaver form factors, thus making these form factors feasible for use by technicians to cleave optical fibers.

Figure 1:
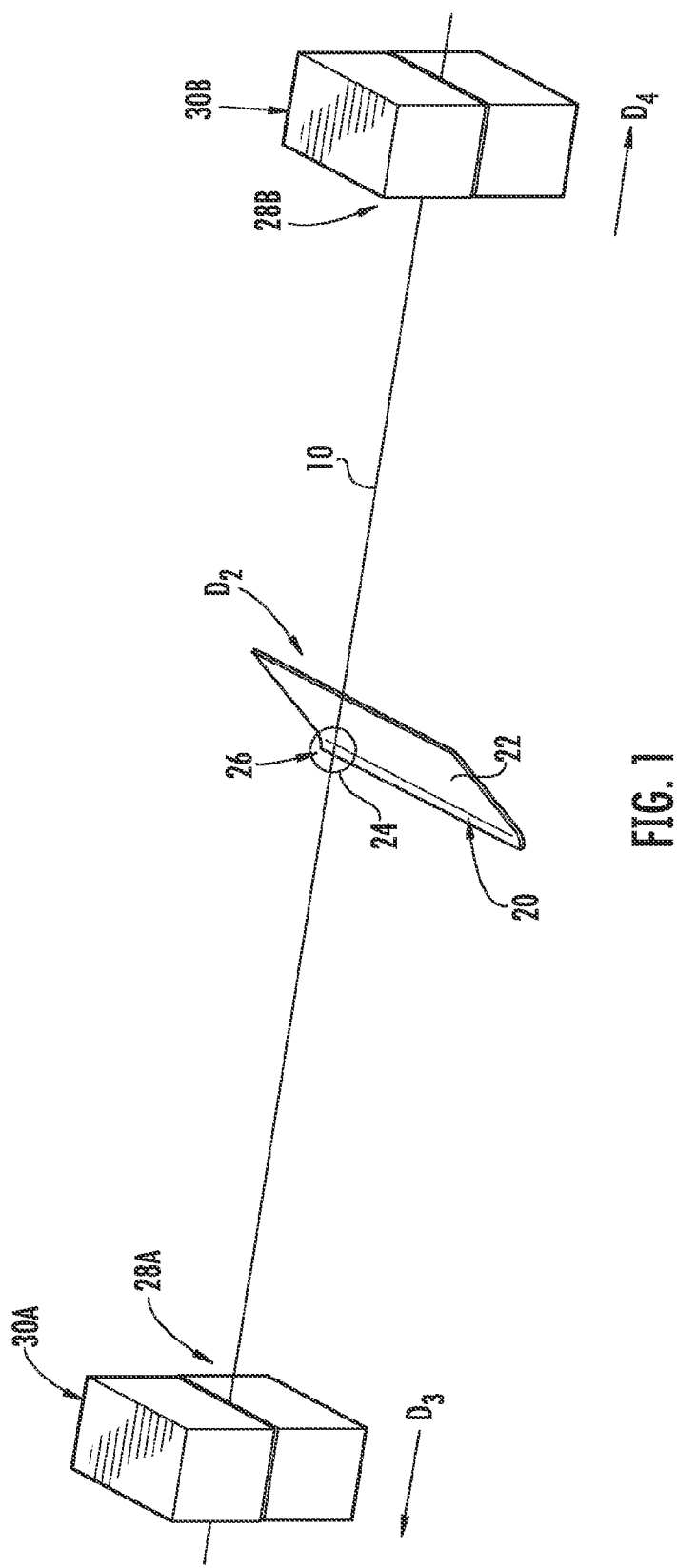
FIG. 1 is an exemplary method for cleaving an optical fiber by creating a flaw in a portion of the optical fiber using an abrasive medium.
Figure 2:
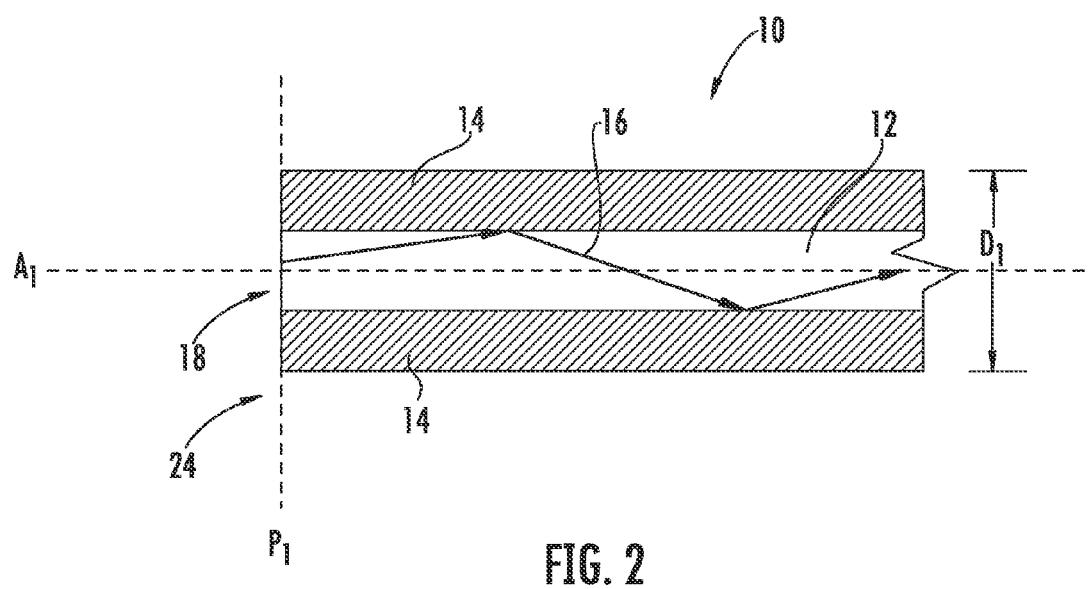
FIG. 2 schematically illustrates an exemplary end face of the optical fiber of FIG. 1 after being cleaved using the abrasive medium in FIG. 1.

In this regard, FIG. 1 is an exemplary method for cleaving an optical fiber by creating or inducing a flaw in a portion of the optical fiber using an abrasive medium. As illustrated therein, an optical fiber 10 is provided. The optical fiber 10 can be any type of optical fiber, including but not limited to a single-mode optical fiber and a multi-mode optical fiber. The optical fiber 10 may be of any size diameter $D_1$, as illustrated in FIG. 2. The optical fiber 10 may include a core 12 surrounded by cladding 14 to provide total internal reflection (TIR) of light 16 propagated down the core 12, as illustrated in FIG. 2. The cladding 14 may be provided as glass or other material, including but not limited to a polymer cladding such as a plastic clad silica as an example. An outer coating (not shown) may be disposed around the cladding 14. The optical fiber 10 may be provided as part of a single fiber or multi-fiber fiber optic cable.

When splicing or connectorizing the optical fiber 10, it is necessary to provide an end face 18 on the optical fiber 10, as schematically illustrated in FIG. 2. The end face 18 is aligned with an end face of another optical fiber to transfer the light 16 from the optical fiber 10 to the spliced or connected optical fiber. When splicing or connectorizing an optical fiber, it is important to provide an end face 18 that has a relatively smooth and mirror-like surface to achieve an efficient light transfer. It is also important to avoid damaging the core 12 and/or the cladding 14 of the optical fiber 10. In this regard, the optical fiber 10 is cleaved to prepare the end face 18. The end face 18 is prepared by introducing a flaw into a portion of the optical fiber 10. The end face 18 is formed when the optical fiber 10 is broken about the induced flaw.

In this regard, instead of employing a conventional blade to cleave the optical fiber, an abrasive medium 20 is employed, as illustrated in FIG. 1. The abrasive medium 20 is an abrasive material. The abrasive medium 20 is disposed on a carrier 22 in this embodiment. The carrier 22 is controlled to bring the abrasive medium 20 in contact with a portion 24 of the optical fiber 10, as illustrated in FIG. 1, to induce a flaw 26 in the portion 24 of the optical fiber 10. The flaw 26 cracks the portion 24 of the optical fiber 10. The end face 18 is created in the portion 24 of the optical fiber 10 by breaking the optical fiber 10 at the flaw 26. In this manner, the abrasive medium 20 cleaves the optical fiber 10.

The abrasive medium 20 is not a conventional blade in this embodiment. A conventional blade is typically a hardened material that has a sharp edge. The abrasive medium 20 does not have a sharp edge. A conventional blade has a smooth surface, wherein the abrasive medium 20 does not have a smooth surface. Simply stated, the abrasive medium 20 does not include a sharp blade that can easily be placed into precise contact with an optical fiber like the conventional blade. Thus, the cleaving of the optical fiber 10 in FIG. 1 using the abrasive medium 20 is a bladeless form and method of cleaving the optical fiber 10.

The carrier 22 may be controlled by human hand or a cleaving device, examples of which will be described below in this disclosure, to place the abrasive medium 20 in contact with the optical fiber 10 to induce the flaw 26 in the optical fiber 10. In the embodiment of FIG. 1, the optical fiber 10 is held in place while the carrier 22 is moved in a direction $1)_2$ towards the portion 24 of the optical fiber 10 to bring the abrasive medium 20 in contact with the portion 24 of the optical fiber 10. The carrier 22 may be controlled in a swiping motion for example. Alternatively, the carrier 22 could be held in place and the portion 24 of the optical fiber 10 moved to be brought into contact with the abrasive medium 20. In either case, relative movement is created between the portion 24 of the optical fiber 10 and the abrasive medium 20 to create the flaw 26.

Any coating (not shown) disposed on the outside of the optical fiber 10 is removed prior to placing the abrasive medium 20 in contact with the optical fiber 10 so that the abrasive medium 20 directly contacts glass of the optical fiber 10. In this regard, any coating disposed around the core 12 and/or the cladding 14 may be removed prior to placing the abrasive medium 20 in contact with the optical fiber 10.

The abrasive medium 20 may be material provided in grit form on the carrier 22. The abrasive medium 20 may be provided by any type of material or combination or compound of elements or materials. Non-limiting examples of the abrasive medium 20 include, but are not limited to diamond, silicon carbide, aluminum oxide, silicon dioxide, cerium oxide, and ferris oxide. The size of the abrasive medium 20 may be any suitable size. As an example only, the size of the abrasive medium 20 may be between five (5) and twenty (20) micrometers (μm) as a non-limiting example. For example, the abrasive medium 20 may be fifteen (15) μm diamond, or eight (8) μm carbide, as non-limiting examples.

The carrier 22 may be any material that is configured to support the abrasive medium 20 disposed or deposited thereon. For example, the carrier 22 may be a film such as a polishing film. The abrasive medium 20 is disposed on a surface of the carrier 22. The abrasive medium 20 may be disposed or deposited on the entire surface area of the carrier 22 or only a portion of the surface area of the carrier 22. For example, the abrasive medium 20 may be disposed on an edge of the carrier 22. Other non-limiting examples of carriers, include, but are not limited to a wire, a string, a block, and a body. The carrier 22 may be of any size and made from any type of material desired, including but not limited to a polymer, plastic, and metal, as non-limiting examples. The quality and nature of the abrasive medium 20 and the carrier 22 determine the life or number of uses to cleave the optical fiber 10.

The carrier 22 may be rigid or flexible. In the embodiment illustrated in FIG. 1, the carrier 22 is flexible. Providing a flexible carrier 22 allows a precise portion of the abrasive medium 20 disposed or deposited thereon to be placed into contact with the optical fiber 10 to induce the flaw 26 in the portion 24 of the optical fiber 10 in FIG. 1 in this embodiment. Providing a flexible carrier 22 may also allow the deploying of the abrasive medium 20 in cleavers and other packagings that may not be possible or convenient if a conventional blade cleaver were employed. Examples of such cleavers and packagings are discussed in more detail below with regard to FIGS. 3-14.

The optical fiber 10 may be placed under stress prior to placing the abrasive medium 20 in contact with the optical fiber 10 to cleave the same. Placing the optical fiber 10 under stress prevents the portion 24 of the optical fiber 10 from moving when contacted by the abrasive medium 20. Placing the optical fiber 10 under stress prior to inducing the flaw 26 in the optical fiber 10 with the abrasive medium 20 also propagates the induced flaw 26 to cleave the optical fiber 10. Examples of placing the optical fiber 10 under stress includes but is not limited to placing a tension on the optical fiber 10, rotating or twisting the optical fiber 10, or bending the optical fiber 10.

For example, the optical fiber 10 in FIG. 1 is placed under tension prior to the abrasive medium 20 being placed into contact with the portion 24 of the optical fiber 10. As illustrated in FIG. 1, portions 28A, 28B of the optical fiber 10 disposed on each side of the portion 24 of the optical fiber 10 where the flaw 26 is desired to be induced are clamped by clamps 30A, 30B. The clamps 30A, 30B with the portions 28A, 28B of the optical fiber 10 secured therein may be pulled away from each other in directions $D_3$ and $D_4$ to place the portion 24 of the optical fiber 10 under tension. Thus, once the flaw 26 is introduced by the abrasive medium 20 in the portion 24 of the optical fiber 10, the tension will cause the portion 24 of the optical fiber 10 to break about the flaw 26 to create the end face 18. If the portion 24 of the optical fiber 10 is not placed under a stress when the flaw 26 is introduced by the abrasive medium 20, a stress could be subsequently placed on the portion 24 of the optical fiber 10 to create the break about the flaw 26 to create the end face 18.

It may also be desirable to bend the portion 24 of the optical fiber 10 in addition to placing the portion 24 of the optical fiber 10 under a tension or other stress prior to inducing the flaw 26 with the abrasive medium 20. Placing a bend in the portion 24 of the optical fiber 10 assists in propagating the flaw 26 into a break in the portion 24 of the optical fiber 10 to create the end face 18. Placing a bend in the portion 24 of the optical fiber 10 creates tension on the outside surface of a bent portion of the optical fiber 10, which assists in propagating the flaw 26 into a break in the portion 24 of the optical fiber 10.

After the portion 24 of the optical fiber 10 is broken at the flaw 26, the end face 18 is created, as illustrated by example in FIG. 2. The end face 18 illustrated in FIG. 2 is disposed in the portion 24 of the optical fiber 10 in a cross-sectional plane $P_1$ orthogonal or substantially orthogonal to a longitudinal axis $A_1$ of the optical fiber 10. However, the abrasive medium 20 could also be used to provide an angle-cleaved end face in the portion 24 of the optical fiber 10, if desired. For example, the portion 24 of the optical fiber 10 could be rotated during the introduction of the flaw 26 with the abrasive medium 20 to affect the angle of the end face created in the portion 24 of the optical fiber 10. The apex of the bend disposed in the portion 24 of the optical fiber 10 when the abrasive medium 20 is used to induce the flaw 26 can also affect the angle of the end face created in the portion 24 of the optical fiber 10. Methods of creating an angled-end face using a conventional cleaver blade can be used to create an angled end face using the abrasive medium 20.

Figure 3:
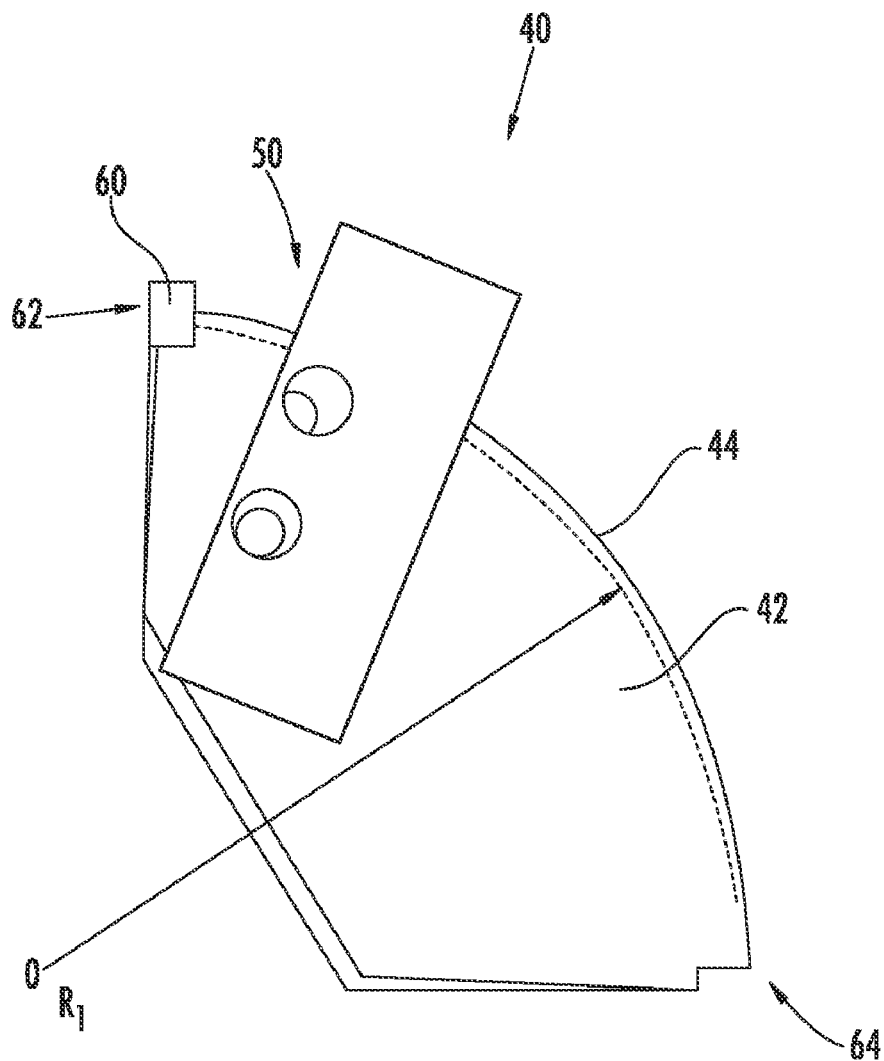
FIG. 3 is a side view of an exemplary bladeless cleaver configured to place an abrasive medium in contact with a portion of the optical fiber to create a flaw in the portion of the optical fiber.

The remainder of this disclosure includes exemplary methods, cleavers, and packagings that employ an abrasive medium to cleave an optical fiber. The methods and principles discussed above and with respect to FIGS. 1 and 2 may be employed in these methods, cleavers, and packagings. In this regard, FIG. 3 is a side view of an exemplary bladeless cleaver 40 that is configured to support an abrasive medium that is placed in contact with a portion of an optical fiber to cleave the optical fiber. As will be discussed in more detail below with regard to FIGS. 3-10, the bladeless cleaver 40 is designed to allow a technician to engage a portion of an optical fiber to be cleaved, to place a bend in the portion of the optical fiber, to clamp and strip the portion of the optical fiber, and place a supported abrasive material in contact with the portion of the optical fiber to create a flaw in the portion of the optical fiber.

Figure 4:
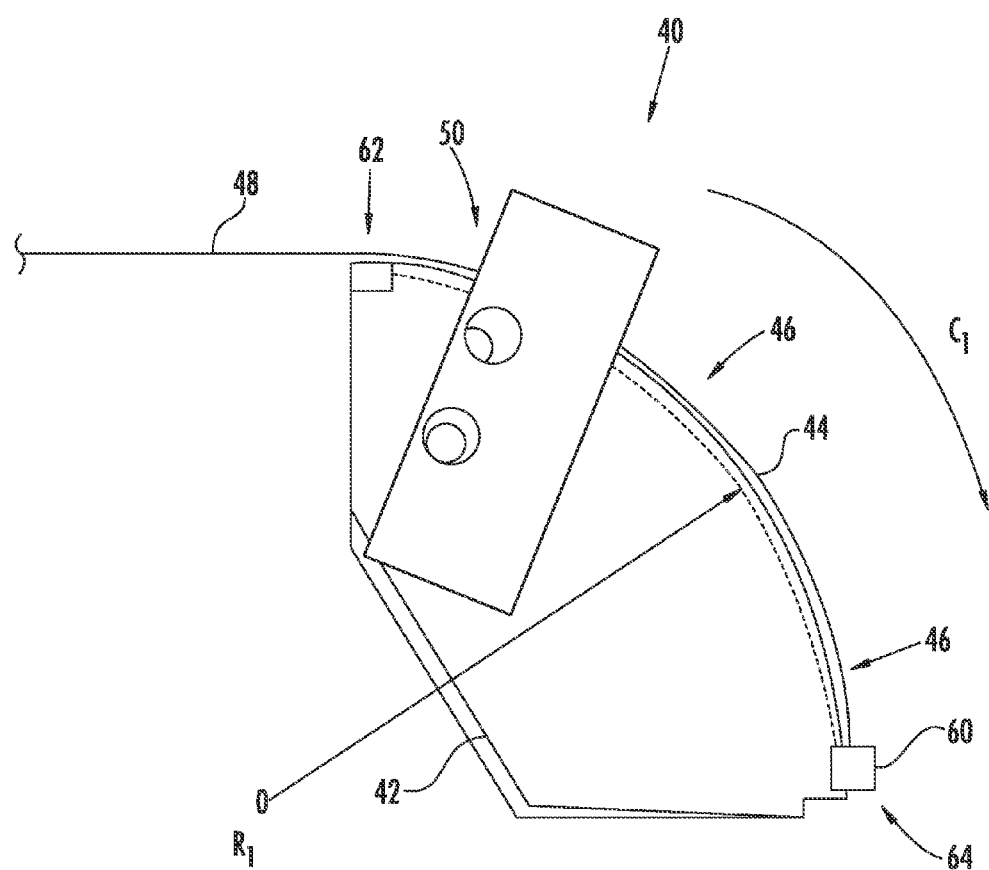
FIG. 4 is a side view of the bladeless cleaver of FIG. 3 with a portion of an optical fiber inserted into a fiber stripper disposed in the bladeless cleaver and disposed along a guide surface of the bladeless cleaver.

As illustrated in FIG. 3, the bladeless cleaver 40 includes a body 42. The body 42 supports other components of the bladeless cleaver 40 as will be described below. The body 42 contains a guide surface 44 to guide a portion 46 of an optical fiber 48 to be cleaved, as illustrated in FIG. 4. The optical fiber 48 may have any of the attributes of the optical fiber 10 discussed above with regard to FIGS. 1 and 2, as an example. In this embodiment, the guide surface 44 is an arcuate surface of radius $R_1$ for placing a bend in the portion 46 of the optical fiber 48 prior to cleaving the portion 46 of the optical fiber 48. However, the guide surface 44 is not required to be an arcuate surface. If the guide surface 44 is arcuate, the guide surface 44 may be of any radius desired.

Figure 6:
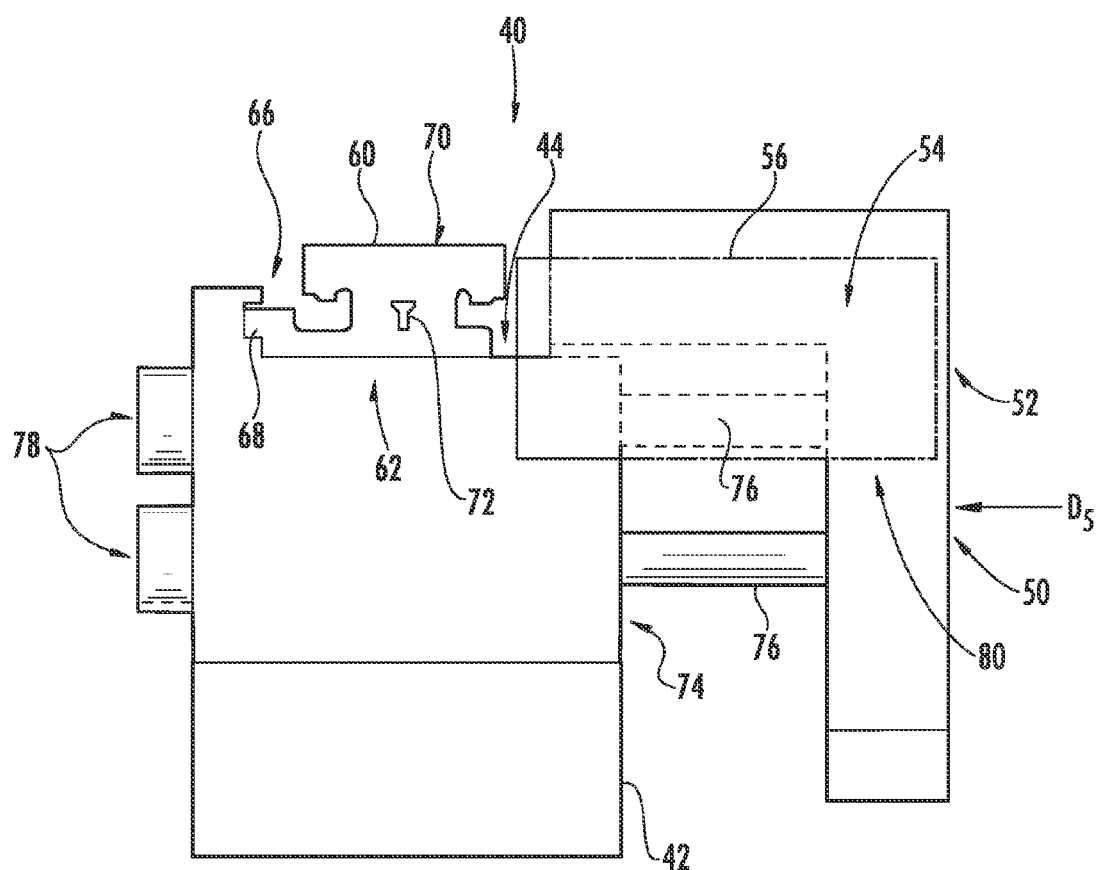
FIG. 6 is a left view of the bladeless cleaver of FIG. 3 prior to insertion of an optical fiber into a clamp of the fiber stripper.
Figure 8:
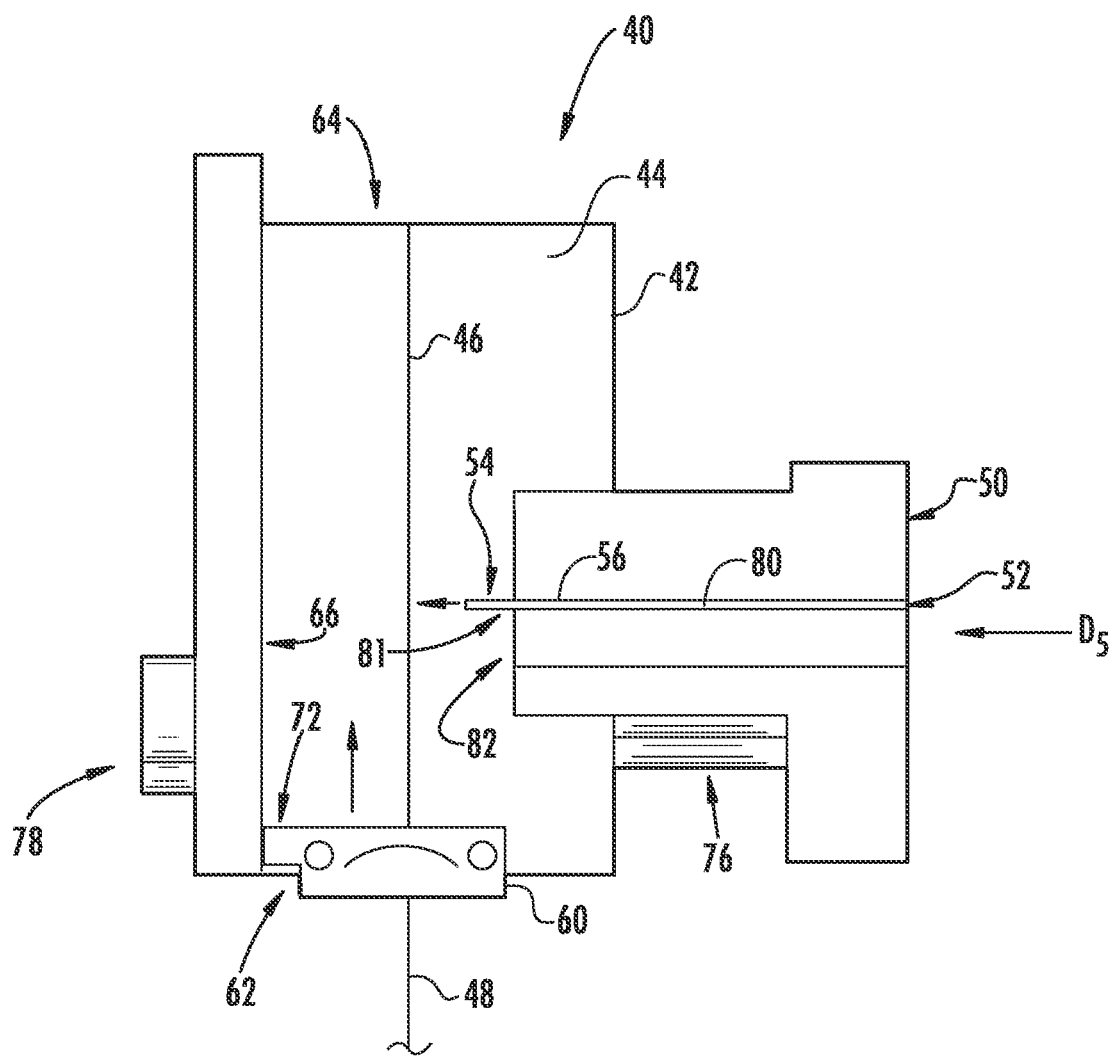
FIG. 8 is a top view of the bladeless cleaver and optical fiber illustrated in FIG. 7.

A cleaver structure 50 is attached to the body 42 and contains an abrasive medium structure 52 configured to support an abrasive medium 54, as illustrated in FIGS. 6 and 8. As will be described in more detail below, the cleaver structure 50 is configured to be actuated to place the abrasive medium 54 in contact with the portion 46 of the optical fiber 48 to create a flaw in the portion 46 of the optical fiber 48. The abrasive medium 54 may have any of the characteristics of the abrasive medium 20 discussed above with regard to FIGS. 1 and 2. Further, the abrasive medium 54 may be disposed on a carrier 56, as illustrated in FIGS. 6 and 8. The carrier 56 may have any of the characteristics of the carrier 22 discussed above with regard to FIGS. 1 and 2.

A fiber stripper 60 is optionally attached to the body 42 in this embodiment to strip coating from the portion 46 of the optical fiber 48 disposed about the guide surface 44 of the body 42. The fiber stripper 60 is used to strip coating from the portion 46 of the optical fiber 48 prior to the cleaver structure 50 placing the abrasive medium 54 in contact with the portion 46 of the optical fiber 48. When the portion 46 of the optical fiber 48 is initially disposed about the guide surface 44 of the body 42, the fiber stripper 60 is disposed at a first end 62 of the guide surface 44, as illustrated in FIG. 3. The portion 46 of the optical fiber 48 may then be disposed around the entire guide surface 44 until the portion 46 of the optical fiber 48 reaches a second end 64 of the guide surface 44, as also illustrated in FIG. 3. Thereafter, the fiber stripper 60 may be aligned and secured to the portion 46 of the optical fiber 48 to prepare the same for stripping. In other words, the optical fiber 48 is inserted into fiber stripper 60 so that an end of the optical fiber 48 extends a suitable distance therein such as to second end 64 when the fiber stripper 60 is disposed on the first end 62 of the guide surface 44. Thereafter, the fiber stripper 60 can then be translated when secured to the portion 46 of the optical fiber 48 circumferentially around the guide surface 44, noted as $C_1$ in FIG. 4, until the fiber striper 60 is disposed at the second end 64 of the guide surface 44, as illustrated in FIG. 4. As the fiber stripper 60 is translated, any coating disposed on the portion 46 of the optical fiber 48 is removed by fiber stripper 60.

Figure 5:
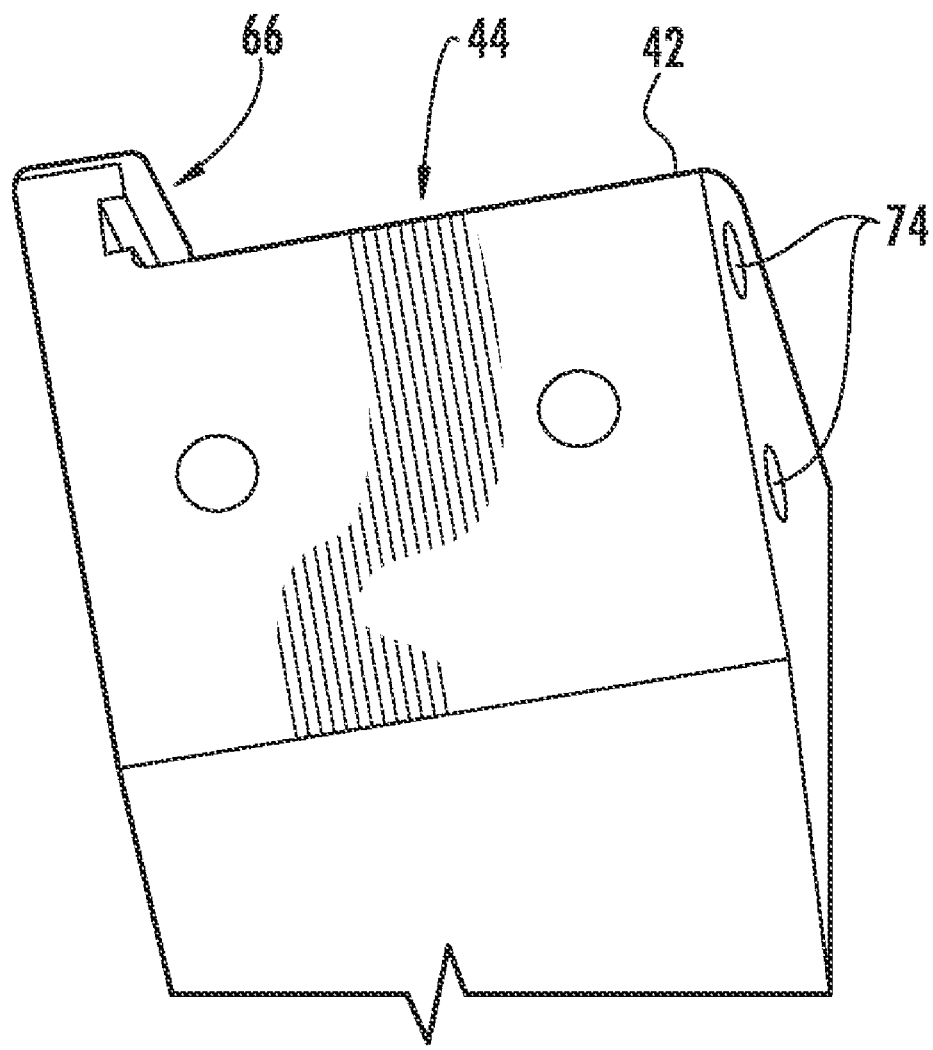
FIG. 5 is a left perspective view of the body of the bladeless cleaver of FIG. 3 illustrating a fiber stripper disposed in a track disposed along the guide surface of the bladeless cleaver to allow the fiber stripper to be translated about the guide surface to strip coating from the portion of the optical fiber.

By way of example FIG. 5 illustrates the translation of the fiber stripper 60 circumferentially about the guide surface 44 to strip the portion 46 of the optical fiber 48. In this embodiment, a guide or track 66 is disposed in the body 42 of the bladeless cleaver 40 adjacent the guide surface 44. The track 66 is disposed around the radius $R_1$ of the guide surface 44 in this embodiment. The track 66 retains the fiber stripper 60 and allows the fiber stripper 60 to be secured to the body 42 as the fiber stripper 60 is translated circumferentially about the guide surface 44. This is further illustrated in FIG. 6 illustrating a left side view of the bladeless cleaver 40. As illustrated therein, the fiber stripper 60 is engaged to the track 66 in the body 42 at the first end 62 of the guide surface 44. The fiber stripper 60 contains a protrusion 68 that acts as a rail configured to engage with the track 66, but other suitable guide structures are possible.

The fiber stripper 60 in this embodiment also contains a clamp 70 to secure the fiber stripper 60 to the portion 46 of the optical fiber 48 prior to stripping in this embodiment, as illustrated in FIG. 6. In this embodiment, the clamp 70 is disposed in the fiber stripper 60, but such is not required. The clamp 70 illustrated in FIG. 6 is open to receive the portion 46 of the optical fiber 48. When the clamp 70 is open, the clamp 70 disposed in the fiber stripper 60 contains an opening 72 configured to receive the portion 46 of the optical fiber 48 when disposed therein. The portion 46 of the optical fiber 48 is inserted through the opening 72 when disposing the portion 46 of the optical fiber 48 around the guide surface 44 of the bladeless cleaver 40 (see also, FIG. 4). To secure the fiber stripper 60 to the portion 46 of the optical fiber 48, the clamp 70 is closed onto the portion 46 of the optical fiber 48 when the fiber stripper 60 is disposed at the first end 62 of the guide surface 44, as illustrated in the left side and top views of the bladeless cleaver 40 in FIGS. 7 and 8, respectively. When the clamp 70 is closed, the size of the opening 72 is reduced from when the clamp 70 is opened, as illustrated in FIG. 6, to secure the fiber stripper 60 to the portion 46 of the optical fiber 48. The opening 72 when the clamp 70 is closed is designed to be sized such that any coating on the portion 46 of the optical fiber 48 is removed when the fiber stripper 60 is translated circumferentially about the guide surface 44 to the second end 64 without damaging the glass of the optical fiber 48, as illustrated in the top view of the bladeless cleaver 40 in FIG. 9. The clamp 70 may also place a stress on the portion 46 of the optical fiber 48 prior to cleaving.

As discussed above and illustrated in FIGS. 3 and 4, the bladeless cleaver 40 includes the cleaver structure 50 attached to the body 42 to support the carrier 56 having the abrasive medium 54 disposed thereon. The cleaver structure 50 controls placing the abrasive medium 54 in contact with the portion 46 of the optical fiber 48 to induce a flaw therein, as described below. As illustrated in FIGS. 5 and 6, the body 42 contains openings 74 that are configured to support attachment of the cleaver structure 50 to the body 42. As illustrated in FIG. 6, two shafts 76, one hidden by the carrier 56 and one unobstructed, are disposed in the cleaver structure 50 to space apart the cleaver structure 50 from the body 42 when the cleaver structure 50 is attached to the body 42. The shafts 76 are disposed through the openings 74 in the body 42. Springs (not shown) are disposed inside the shafts 76, wherein the springs bottom out in blind holes 78 disposed on the opposite side of the body 42 from the openings 74. In this manner, the cleaver structure 50 is spring-actuated with the body 42.

The cleaver structure 50 can be actuated to be moved in a direction $D_5$ towards the body 42 and guide surface 44, as illustrated in FIGS. 6 and 8, by exerting a force on the cleaver structure 50 towards the body 42. The springs inside the shafts 76 are compressed as a result, and the cleaver structure 50 is moved against the body 42, as illustrated in the top view of the bladeless cleaver 40 in FIG. 10. When the force exerted on the cleaver structure 50 is released, the springs in the shafts 76 release their stored energy and the cleaver structure 50 is returned to its position in FIG. 6. Because the carrier 56 having the abrasive medium 54 disposed thereon is disposed in the abrasive medium structure 52 disposed in the cleaver structure 50, when the cleaver structure 50 is moved towards the body 42, the cleaver structure 50 places the abrasive medium 54 into contact with the portion 46 of the optical fiber 48 to induce a flaw in the portion 46 of the optical fiber 48. Due to the stress induced into the portion 46 of the optical fiber 48 by the clamp 70 of the fiber stripper 60 as previously discussed and illustrated in FIG. 4, the portion 46 of the optical fiber 48 is cleaved due to the bend disposed in the portion 46 of the optical fiber 48 and/or the stress due to the clamping of the portion 46 of the optical fiber 48 by the clamp 70.

To support the abrasive medium 54 in the cleaver structure 50, the abrasive medium structure 52 is disposed in the cleaver structure 50 in this embodiment. The abrasive medium structure 52 supports the carrier 56 containing the abrasive medium 54. Providing an abrasive medium structure 52 allows the abrasive medium 54 to be disposed within the bladeless cleaver 40 as opposed to having to be provided and handled separately by a technician from a cleaver. Thus, the alignment and contact of the abrasive medium 54 with the portion 46 of the optical fiber 48 is controlled by the cleaver structure 50 for quality and repeatability in cleaving.

Figure 7:
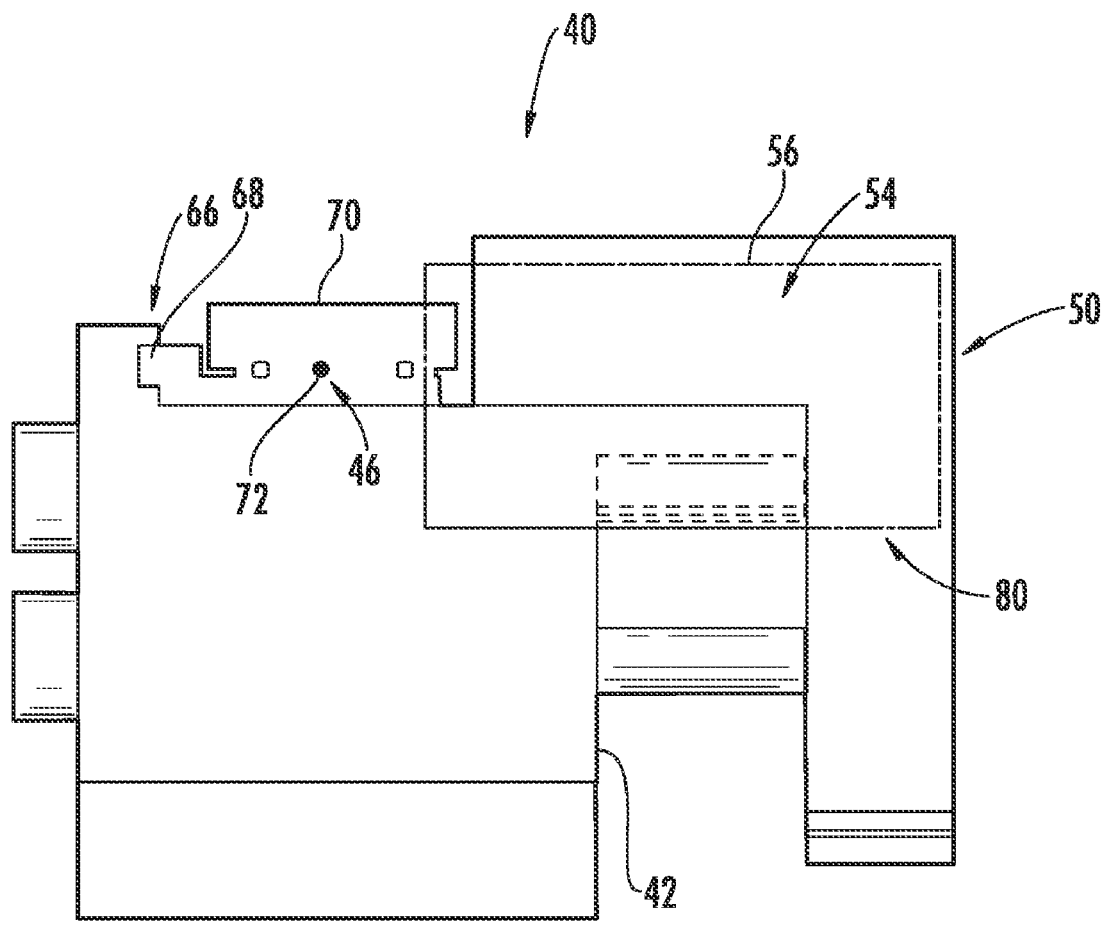
FIG. 7 is a left view of the bladeless cleaver of FIG. 3 after insertion of an optical fiber into the fiber stripper and the clamp of the fiber stripper closed.
Figure 9:
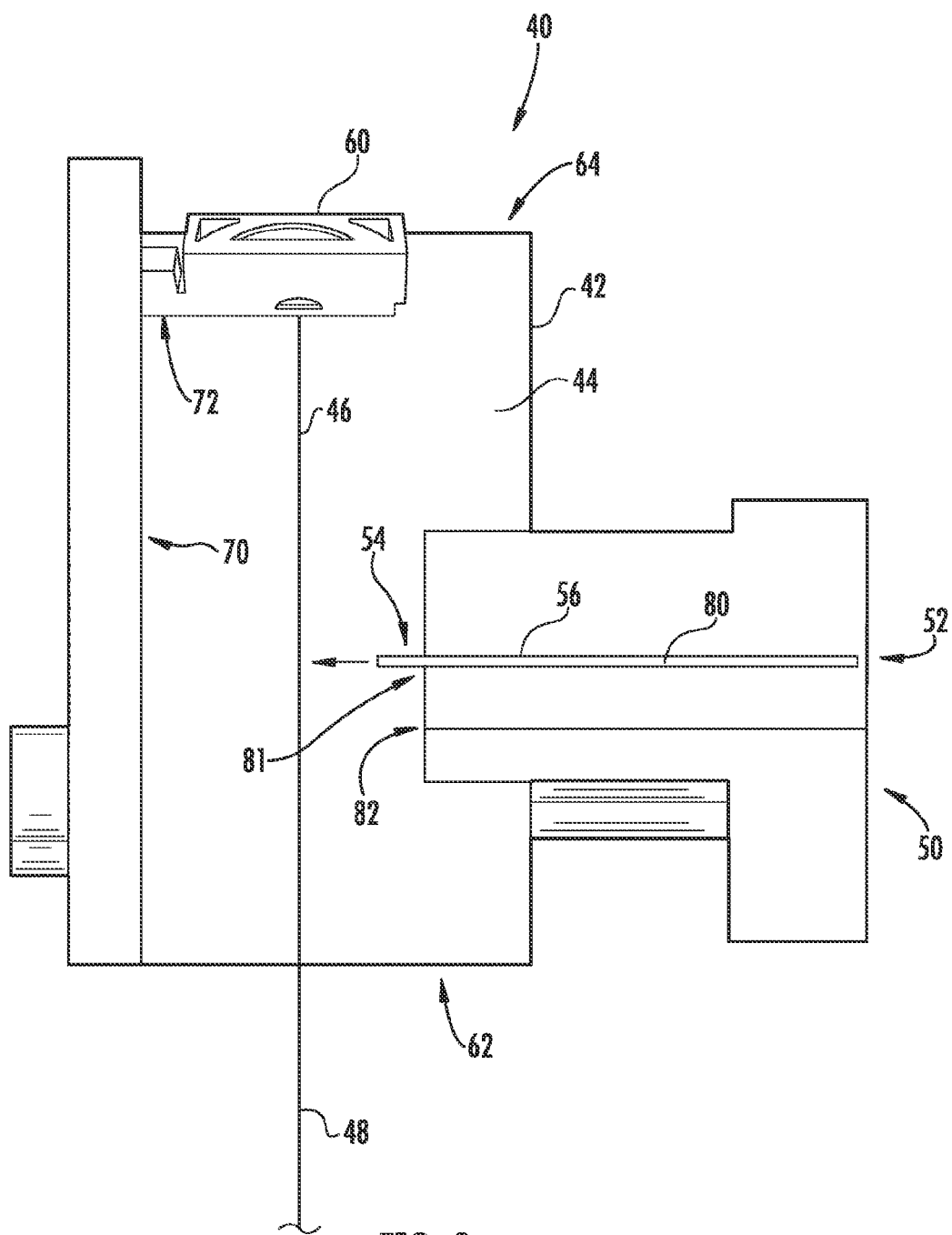
FIG. 9 is a top view of the bladeless cleaver of FIGS. 7 and 8 with the fiber stripper translated about the guide surface to strip the optical fiber clamped by the fiber stripper.
Figure 10:
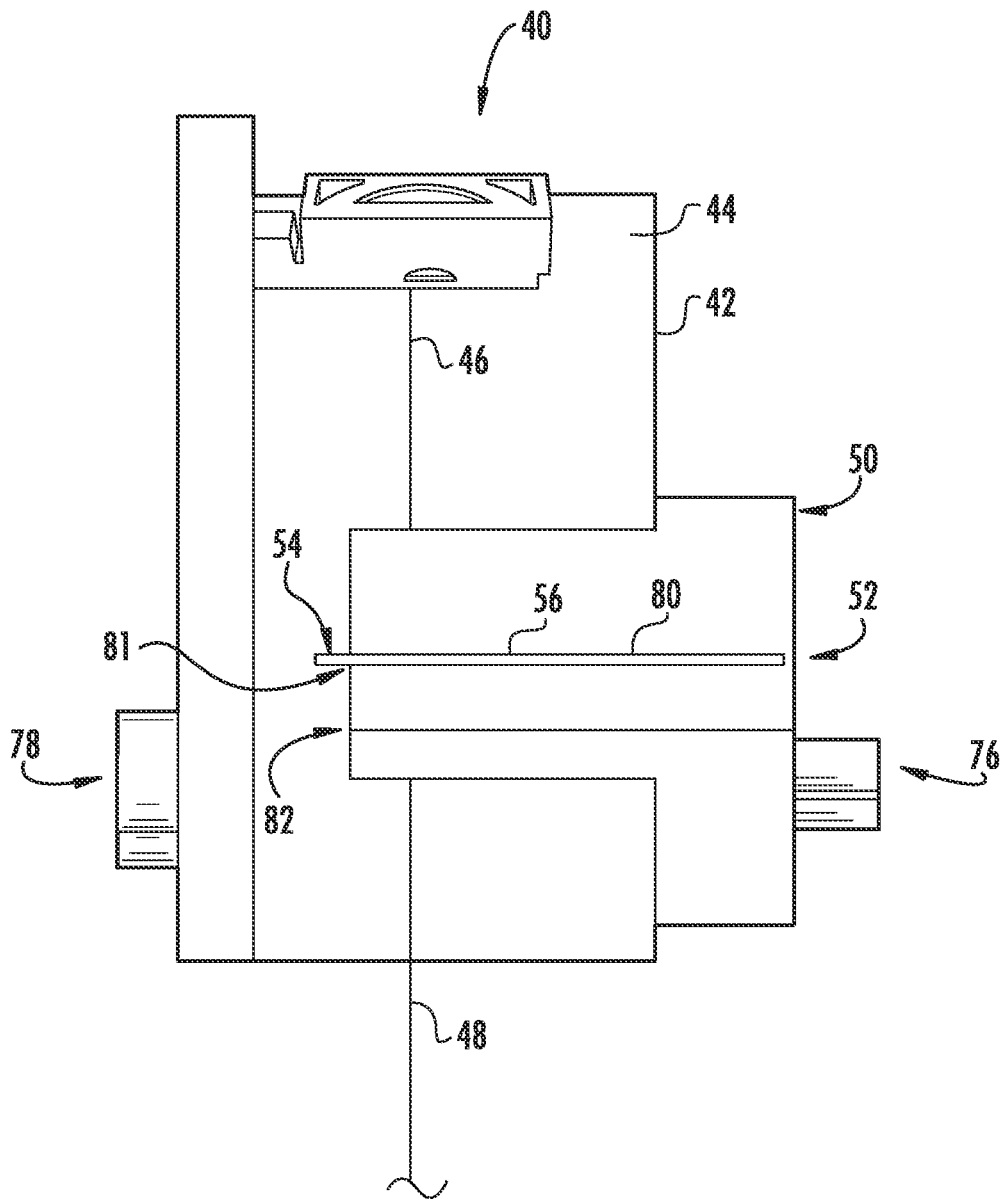
FIG. 10 is a top view of the bladeless cleaver of FIG. 9 with a cleaver structure supporting an abrasive medium actuated to place the abrasive medium in contact with a stripped portion of the optical fiber to create a flaw in the stripped portion of the optical fiber.

In this embodiment, as illustrated in the top views of the bladeless cleaver 40 in FIGS. 8-10, the abrasive medium structure 52 is provided in the form of an abrasive medium compartment 80. The abrasive medium compartment 80 is an opening 81 in this embodiment that is configured to allow the carrier 56 containing the abrasive medium 54 to be disposed therein. FIGS. 6 and 7 illustrated the carrier 56 inserted into the abrasive medium compartment 80 from a side view. The opening 81 does not extend all the way through the cleaver structure 50. Alternatively, the opening 81 could extend all the way through the cleaver structure 50. In this embodiment, the abrasive medium compartment 80 is disposed at an angle with respect to a tangent plane of the guide surface 44, although any orientation desired can be provided for the abrasive medium compartment 80 in the cleaver structure 50.

A technician can insert the carrier 56 containing the abrasive medium 54 prior to cleaving. The carrier 56 inserted into the abrasive medium compartment 80 extends beyond the opening 81 in the abrasive medium compartment 80 on a left side 82 of the cleaver structure 50 in this embodiment, as illustrated in FIGS. 8-10. The carrier 56 is designed and sized such that the abrasive medium 54 disposed thereon does not come into contact with the portion 46 of the optical fiber 48 disposed along the guide surface 44 when a force is not exerted against the carrier structure 50, as illustrated in FIGS. 8 and 9. However, when a force is exerted on the carrier structure 50, the sizing of the carrier 56 disposed in the abrasive medium compartment 80 is such that the abrasive medium 54 disposed on the carrier 56 comes into contact with the portion 46 of the optical fiber 48, thereby inducting a flaw, as illustrated in FIG. 10.

Figure 11:
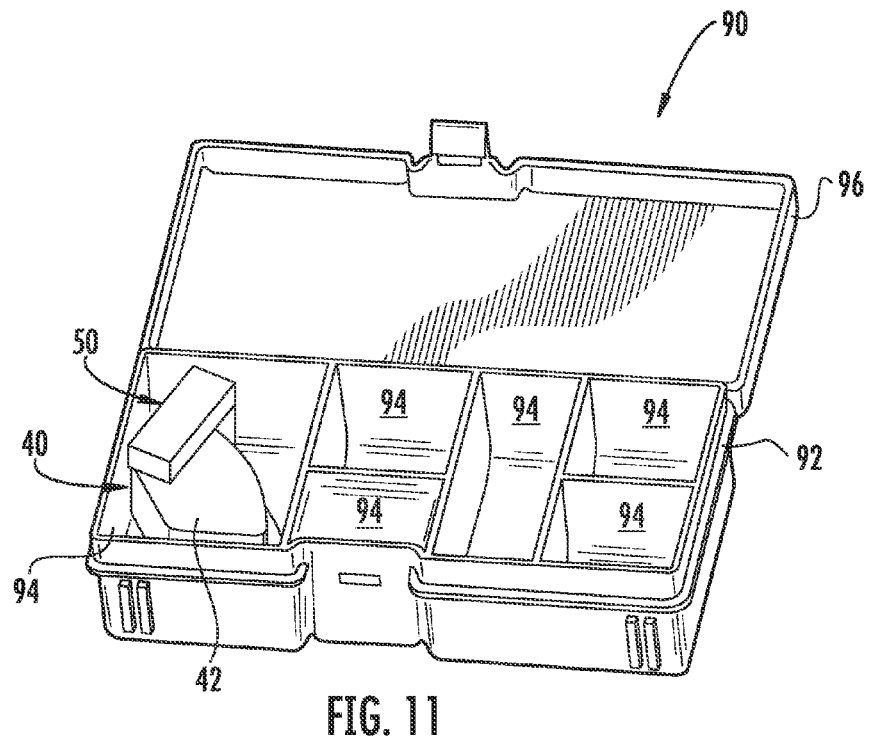
FIG. 11 is a front perspective view of the bladeless cleaver of FIG. 3 disposed in a compartment of a fiber optic package.

The bladeless cleaver 40 described above may be used by a technician to cleave an optical fiber to prepare an end face in the field to prepare a termination. For example, the termination may be prepared for splicing the optical fiber to another optical fiber or connectorizing the optical fiber. Preparing the termination may also include employing other components, such as connectors, crimp rings, boots, and other tools, as examples. In this regard, a fiber optic package 90 may be provided like illustrated in FIG. 11 as a convenient manner to store these components for easy transport and access by a technician. The fiber optic package 90 includes an enclosure 92 having a plurality of bins or compartments 94 for storing components used by the technician. A cover 96 may be attached to the enclosure 92 to close off access to the compartments 94 to protect the components stored therein. The bladeless cleaver 40 may also be stored in a compartment 94 of the fiber optic package 90, as illustrated in FIG. 11, as a convenient means to include a cleaver with the fiber optic package 90 containing other fiber optic components used to prepare and complete an optical fiber termination. Alternatively, a bladed cleaver may be stored in the compartment 94 of the fiber optic package 90.

Figure 12:
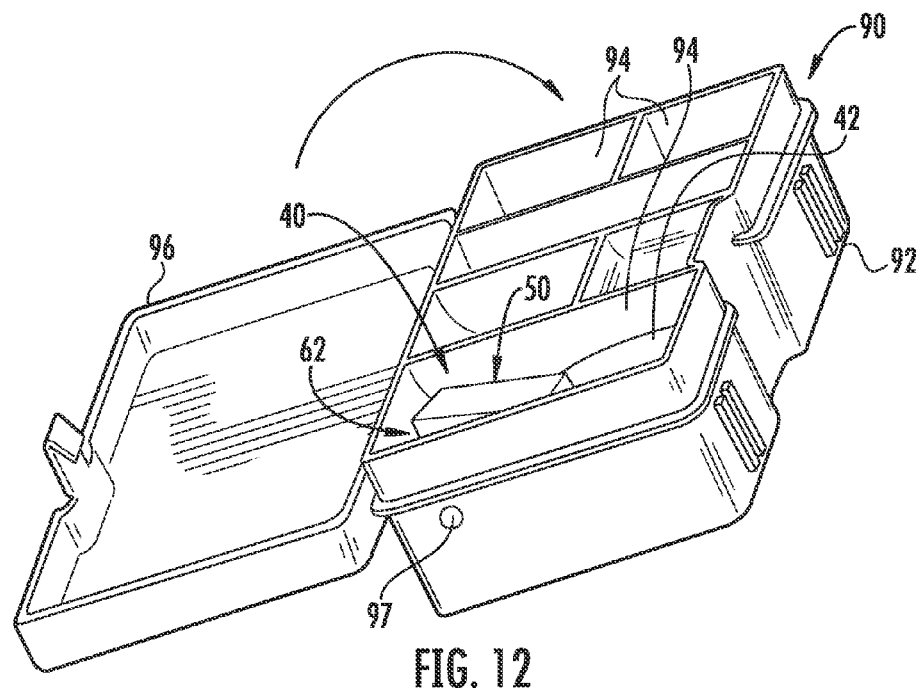
FIG. 12 is a left perspective view of the fiber optic package of FIG. 11 illustrating an opening disposed through the fiber optic package aligned with a guide surface disposed in the bladeless cleaver and configured to receive a portion of an optical fiber and direct the portion of the optical fiber along the guide surface.
Figure 13:
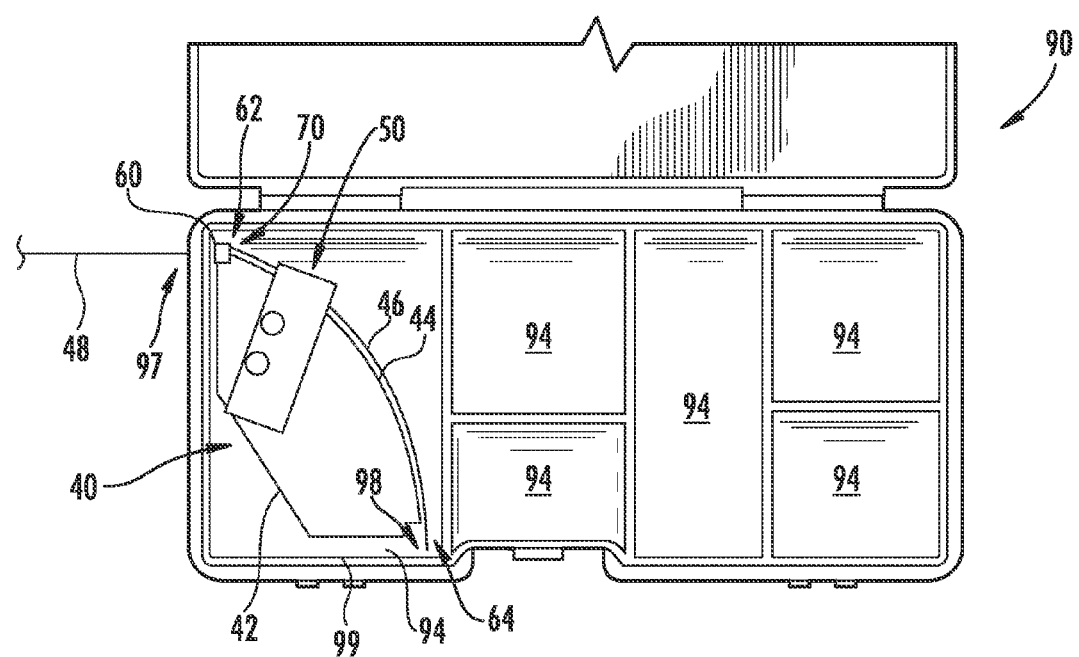
FIG. 13 is a top view of the fiber optic package of FIG. 11 with an optical fiber inserted through the opening of the fiber optic package and the fiber stripper and disposed along the guide surface of the bladeless cleaver.

For additional convenience, the fiber optic package 90 is configured to allow a technician to cleave an optical fiber without having to remove the bladeless cleaver 40 from the fiber optic package 90. In this regard, an opening 97 is disposed through the enclosure 92, as illustrated in FIG. 12. The opening 97 is disposed through the enclosure 92 to provide access to the compartment 94 containing the bladeless cleaver 40. The opening 97 in this embodiment is aligned with the first end 62 of the guide surface 44 of the bladeless cleaver 40. In this manner, when it is desired to cleave an optical fiber using the bladeless cleaver 40 disposed in the fiber optic package 90, the portion 46 of the optical fiber 48 is disposed through the opening 97 in the enclosure 92, as illustrated in FIG. 13. Because the opening 97 is aligned with the first end 62 of the guide surface 44, inserting the portion 46 of the optical fiber 48 through the opening 97 inserts the portion 46 of the optical fiber 48 through the fiber stripper 60. The bladeless cleaver 40 need not be removed from the fiber optic package 90. The portion 46 of the optical fiber 48 can be continued to be pushed through the opening 72 wherein the portion 46 is disposed along the guide surface 44 of the body 42, as previously described. The portion 46 of the optical fiber 48 can be continued to be disposed along the guide surface 44 until the portion 46 of the optical fiber 48 reaches a fiber stop 98, which in this embodiment is an interior wall 99 of the compartment 94 containing the bladeless cleaver 40, as illustrated in FIG. 13.

Figure 14:
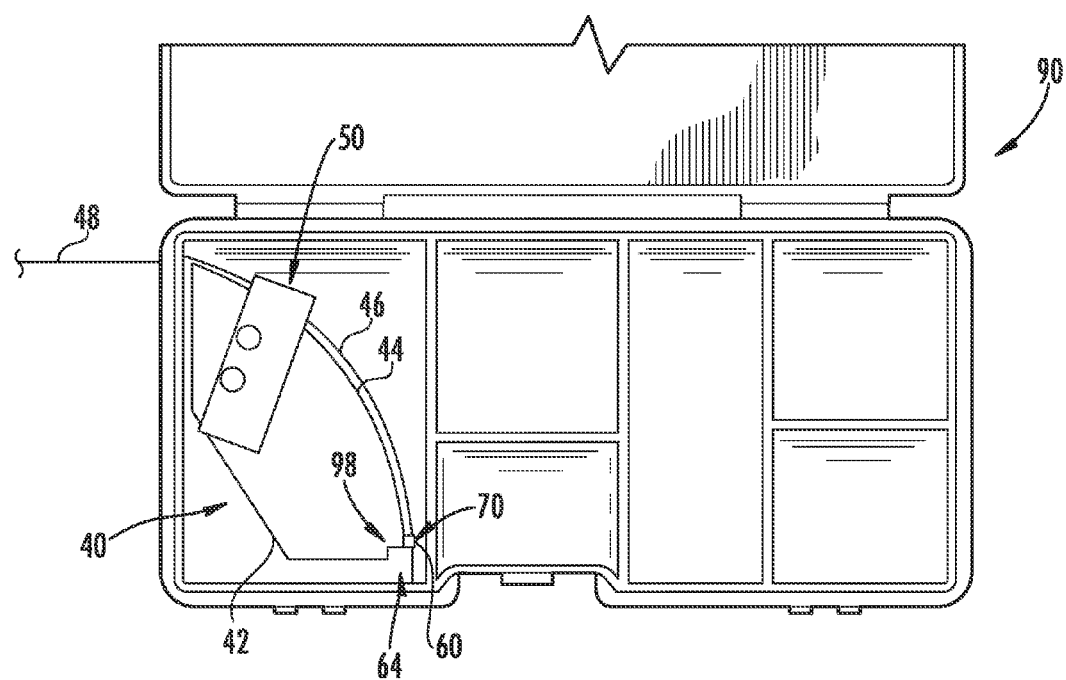
FIG. 14 is a top view of the fiber optic package of FIG. 11 with the fiber stripper of the bladeless cleaver translated about the guide surface to strip the optical fiber clamped by the fiber stripper.

Thereafter, the clamp 70 disposed in the fiber stripper 60 can be closed, as previously described. The portion 46 of the optical fiber 48 is then ready for stripping. In this regard and as previously described, the fiber stripper 60 can be translated about the guide surface 44 to strip coating from the portion 46 of the optical fiber 48. FIG. 14 illustrates the fiber stripper 60 translated to the second end 64 of the guide surface 44 adjacent to the fiber stop 98. The portion 46 of the optical fiber 48 can now be cleaved. In this manner, as previously discussed, a force can be exerted downward on the cleaver structure 50, as illustrated in FIG. 14, to cleave the portion 46 of the optical fiber 48. As previously discussed with regard to FIG. 10, exerting a force to push the cleaver structure 50 into the body 42 causes the abrasive medium 54 disposed on the carrier 56 disposed in the abrasive medium compartment 80 to come into contact with the portion 46 of the optical fiber 48. A flaw is introduced into the portion 46 of the optical fiber 48 as a result, thereby allowing the portion 46 of the optical fiber 48 to be broken about the flaw to create an end face in portion 46 of the optical fiber 48. The methods described above with regard to creating a flaw in an optical fiber employing the bladeless cleaver 40 to cleave an optical fiber may be employed when the bladeless cleaver 40 is disposed in the fiber optic package 90.

For convenience, the cleaver referenced above with regard to FIGS. 11-14 as being included in the compartment 94 of the fiber optic package 90 is the bladeless cleaver 40 of FIGS. 3-10. However, it is to be understood that any other cleaver, including a conventional bladed cleaver, may be included in the compartment 94 of the fiber optic package 90 in FIGS. 11-14. Such bladed cleaver can include a body, a guide surface disposed in the body to guide a portion of an optical fiber, and a cleaver structure attached to the body and comprising an abrasive medium structure configured to support an abrasive medium, wherein the cleaver structure further comprises an actuator configured to actuate with respect to the body to place the abrasive medium in contact with the portion of the optical fiber to create a flaw in the portion of the optical fiber.

The embodiments disclosed herein are not limited to any particular optical fiber, abrasive medium, carrier, angle of cleaving, stress, and fiber stripping, and method of applying the abrasive medium to the optical fiber. The cleaved optical fiber ends disclosed herein may be disposed or formed on individual fibers or arrays of fibers. A polishing process may be performed after the optical fiber is cleaved.

As used herein, it is intended that terms "fiber optic cables" and/or "optical fibers" include all types of single mode and multi-mode light waveguides, including one or more bare optical fibers, loose-tube optical fibers, tight-buffered optical fibers, ribbonized optical fibers, bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163.

Bend insensitive multimode optical fibers may comprise a graded-index core region and a cladding region surrounding and directly adjacent to the core region, the cladding region comprising a depressed-index annular portion comprising a depressed relative refractive index relative to another portion of the cladding. The depressed-index annular portion of the cladding is preferably spaced apart from the core. Preferably, the refractive index profile of the core has a parabolic or substantially curved shape. The depressed-index annular portion may, for example, comprise a) glass comprising a plurality of voids, or b) glass doped with one or more down-dopants such as fluorine, boron, individually or mixtures thereof. The depressed-index annular portion may have a refractive index delta less than about −0.2% and a width of at least about one (1) μm (micron), said depressed-index annular portion being spaced from said core by at least about 0.5 microns.

In some embodiments that comprise a cladding with voids, the voids in some preferred embodiments are non-periodically located within the depressed-index annular portion. By "non-periodically located" we mean that when one takes a cross section (such as a cross section perpendicular to the longitudinal axis) of the optical fiber, the non-periodically disposed voids are randomly or non-periodically distributed across a portion of the fiber (e.g. within the depressed-index annular region). Similar cross sections taken at different points along the length of the fiber will reveal different randomly distributed cross-sectional hole patterns, i.e., various cross sections will have different hole patterns, wherein the distributions of voids and sizes of voids do not exactly match for each such cross section. That is, the voids are non-periodic, i.e., they are not periodically disposed within the fiber structure. These voids are stretched (elongated) along the length (i.e. generally parallel to the longitudinal axis) of the optical fiber, but do not extend the entire length of the entire fiber for typical lengths of transmission fiber. It is believed that the voids extend along the length of the fiber a distance less than about 20 meters, more preferably less than about ten (10) meters, even more preferably less than about 5 meters, and in some embodiments less than one (1) meter.

The multimode optical fiber disclosed herein exhibits very low bend induced attenuation, in particular very low macrobending induced attenuation. In some embodiments, high bandwidth is provided by low maximum relative refractive index in the core, and low bend losses are also provided. Consequently, the multimode optical fiber may comprise a graded index glass core; and an inner cladding surrounding and in contact with the core, and a second cladding comprising a depressed-index annular portion surrounding the inner cladding, said depressed-index annular portion having a refractive index delta less than about −0.2% and a width of at least one (1) micron, wherein the width of said inner cladding is at least about 0.5 microns and the fiber further exhibits a one (1) turn, ten (10) millimeters (mm) diameter mandrel wrap attenuation increase of less than or equal to about 0.4 decibel (dB)/turn at 850 nanometers (nm), a numerical aperture of greater than 0.14, more preferably greater than 0.17, even more preferably greater than 0.18, and most preferably greater than 0.185, and an overfilled bandwidth greater than 1.5 GigaHertz (GHz)-kilometer (km) at 850 nm.

Fifty (50) micron diameter core multimode fibers can be made which provide (a) an overfilled (OFL) bandwidth of greater than 1.5 GHz-km, more preferably greater than 2.0 GHz-km, even more preferably greater than 3.0 GHz-km, and most preferably greater than 4.0 GHz-km at an 850 nm wavelength. These high bandwidths can be achieved while still maintaining a one (1) turn, ten (10) mm diameter mandrel wrap attenuation increase at an 850 nm wavelength of less than 0.5 dB, more preferably less than 0.3 dB, even more preferably less than 0.2 dB, and most preferably less than 0.15 dB. These high bandwidths can also be achieved while also maintaining a 1 turn, 20 mm diameter mandrel wrap attenuation increase at an 850 nm wavelength of less than 0.2 dB, more preferably less than 0.1 dB, and most preferably less than 0.05 dB, and a 1 turn, 15 mm diameter mandrel wrap attenuation increase at an 850 nm wavelength, of less than 0.2 dB, preferably less than 0.1 dB, and more preferably less than 0.05 dB. Such fibers are further capable of providing a numerical aperture (NA) greater than 0.17, more preferably greater than 0.18, and most preferably greater than 0.185. Such fibers are further simultaneously capable of exhibiting an OFL bandwidth at 1300 nm which is greater than about 500 MHz-km, more preferably greater than about 600 MHz-km, even more preferably greater than about 700 MHz-km. Such fibers are further simultaneously capable of exhibiting minimum calculated effective modal bandwidth (Min EMBc) bandwidth of greater than about 1.5 MHz-km, more preferably greater than about 1.8 MHz-km and most preferably greater than about 2.0 MHz-km at 850 nm.

Preferably, the multimode optical fiber disclosed herein exhibits a spectral attenuation of less than 3 dB/km at 850 nm, preferably less than 2.5 dB/km at 850 nm, even more preferably less than 2.4 dB/km at 850 nm and still more preferably less than 2.3 dB/km at 850 nm. Preferably, the multimode optical fiber disclosed herein exhibits a spectral attenuation of less than 1.0 dB/km at 1300 nm, preferably less than 0.8 dB/km at 1300 nm, even more preferably less than 0.6 dB/km at 1300 nm.

In some embodiments, the numerical aperture ("NA") of the optical fiber is preferably less than 0.23 and greater than 0.17, more preferably greater than 0.18, and most preferably less than 0.215 and greater than 0.185.

In some embodiments, the core extends radially outwardly from the centerline to a radius R, wherein $10 \leq R \leq 40$ microns, more preferably $20 \leq R \leq 40$ microns. In some embodiments, $22 \leq R \leq 34$ microns. In some preferred embodiments, the outer radius of the core is between about 22 to 28 microns. In some other preferred embodiments, the outer radius of the core is between about 28 to 34 microns.

In some embodiments, the core has a maximum relative refractive index, less than or equal to 1.2% and greater than 0.5%, more preferably greater than 0.8%. In other embodiments, the core has a maximum relative refractive index, less than or equal to 1.1% and greater than 0.9%.

In some embodiments, the optical fiber exhibits a one (1) turn, ten (10) mm diameter mandrel attenuation increase of no more than 1.0 dB, preferably no more than 0.6 dB, more preferably no more than 0.4 dB, even more preferably no more than 0.2 dB, and still more preferably no more than 0.1 dB, at all wavelengths between 800 and 1400 nm.

Figure 15:
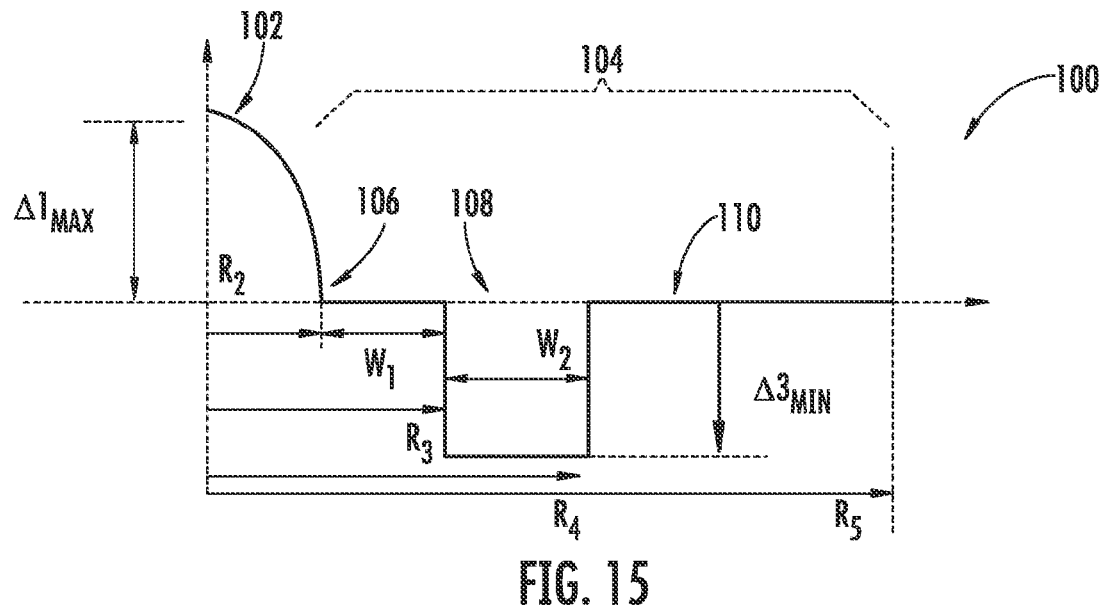
FIG. 15 shows a schematic representation (not to scale) of a refractive index profile of a cross-section of the glass portion of an exemplary embodiment of a multimode optical fiber disclosed herein wherein a depressed-index annular portion is offset from a core and is surrounded by an outer annular portion.
Figure 16:
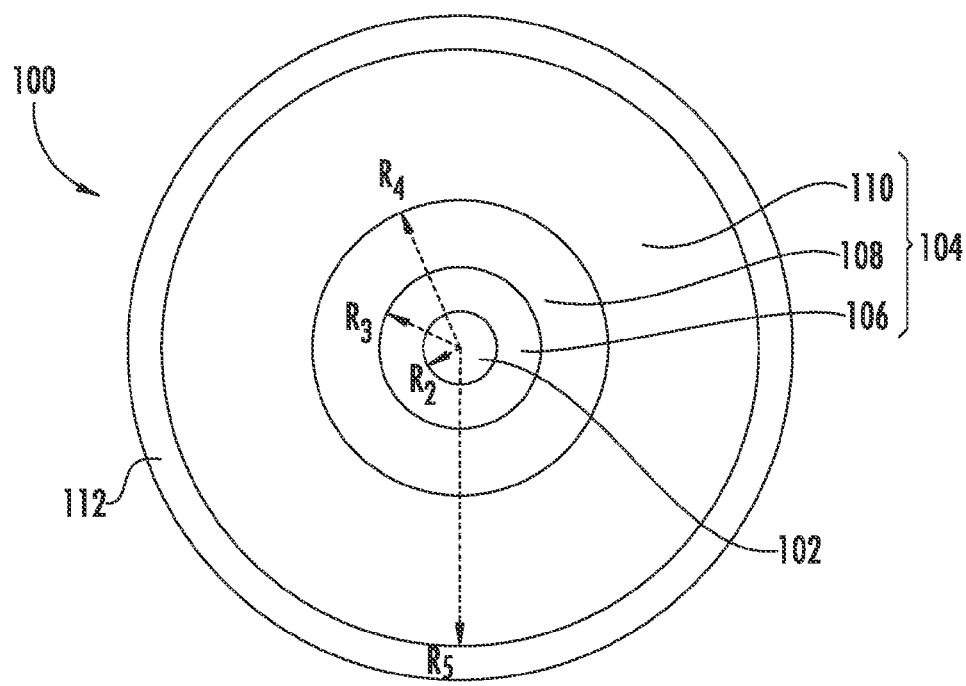
FIG. 16 is a schematic representation (not to scale) of a cross-sectional view of the multimode optical fiber of FIG. 15.

FIG. 15 shows a schematic representation of the refractive index profile of a cross-section of the glass portion of an embodiment of a multimode optical fiber 100 comprising a glass core 102 and a glass cladding 104, the cladding comprising an inner annular portion 106, a depressed-index annular portion 108, and an outer annular portion 110. FIG. 16 is a schematic representation (not to scale) of a cross-sectional view of the optical waveguide fiber of FIG. 15. The core 102 has outer radius $R_2$ and maximum refractive index delta $\Delta 1MAX$. The inner annular portion 106 has width $W_1$ and outer radius $R_3$. Depressed-index annular portion 108 has minimum refractive index delta percent $\Delta 3MIN$, width $W_2$ and outer radius $R_4$. The depressed-index annular portion 108 is shown offset, or spaced away, from the core 102 by the inner annular portion 106. The annular portion 108 surrounds and contacts the inner annular portion 106. The outer annular portion 110 surrounds and contacts the annular portion 106. The clad layer 104 is surrounded by at least one coating 112, which may in some embodiments comprise a low modulus primary coating and a high modulus secondary coating.

The inner annular portion 106 has a refractive index profile $\Delta 2(r)$ with a maximum relative refractive index $\Delta 2MAX$, and a minimum relative refractive index $\Delta 2MIN$, where in some embodiments $\Delta 2MAX=\Delta 2MIN$. The depressed-index annular portion 108 has a refractive index profile $\Delta 3(r)$ with a minimum relative refractive index $\Delta 3MIN$. The outer annular portion 110 has a refractive index profile $\Delta 4(r)$ with a maximum relative refractive index $\Delta 4MAX$, and a minimum relative refractive index $\Delta 4MIN$, where in some embodiments $\Delta 4MAX=\Delta 4MIN$. Preferably, $\Delta 1MAX>\Delta 2MAX>\Delta 3MIN$. In some embodiments, the inner annular portion 106 has a substantially constant refractive index profile, as shown in FIG. 15 with a constant $\Delta 2(r)$; in some of these embodiments, $\Delta 2(r)=0\%$. In some embodiments, the outer annular portion 110 has a substantially constant refractive index profile, as shown in FIG. 15 with a constant $\Delta 4(r)$; in some of these embodiments, $\Delta 4(r)=0\%$. The core 102 has an entirely positive refractive index profile, where $\Delta 1(r)>0\%$. R1 is defined as the radius at which the refractive index delta of the core first reaches value of 0.05%, going radially outwardly from the centerline. Preferably, the core 102 contains substantially no fluorine, and more preferably the core 102 contains no fluorine. In some embodiments, the inner annular portion 106 preferably has a relative refractive index profile $\Delta 2(r)$ having a maximum absolute magnitude less than 0.05%, and $\Delta 2MAX<0.05\%$ and $\Delta 2MIN>-0.05\%$, and the depressed-index annular portion 108 begins where the relative refractive index of the cladding first reaches a value of less than $-0.05\%$, going radially outwardly from the centerline. In some embodiments, the outer annular portion 110 has a relative refractive index profile $\Delta 4(r)$ having a maximum absolute magnitude less than 0.05%, and $\Delta 4MAX<0.05\%$ and $\Delta 4MIN>-0.05\%$, and the depressed-index annular portion 108 ends where the relative refractive index of the cladding first reaches a value of greater than $-0.05\%$, going radially outwardly from the radius where $\Delta 3MIN$ is found.

Many modifications and other embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A method for cleaving an optical fiber without employing a blade, comprising:
   providing an optical fiber;
   creating a flaw in a portion of the optical fiber using a bladeless cleaver comprised of a body and a cleaver structure attached to the body, wherein the cleaver structure is comprised of an actuator configured to actuate with respect to the body to place an abrasive medium disposed in an abrasive medium structure disposed in the cleaver structure in contact with the portion of the optical fiber to create a flaw in the portion of the optical fiber; and
   breaking the optical fiber at the flaw to create a cleaved end face on the optical fiber.

2. The method of claim 1, wherein the abrasive medium is disposed in a flexible carrier disposed in the abrasive medium structure.

3. The method of claim 1, wherein the abrasive medium is comprised from the group consisting of diamond, silicon carbide, aluminum oxide, silicon dioxide, cerium oxide, and ferris oxide.

4. The method of claim 1, further comprising clamping the portion of the optical fiber in a clamp attached to the body to apply a stress to the optical fiber.

5. The method of claim 4, wherein applying the stress to the optical fiber is comprised of tensioning, bending, or rotating the optical fiber.

6. The method of claim 1, further comprising creating relative movement between the portion of the optical fiber and the abrasive medium structure during the creating of the flaw in the portion of the optical fiber.

7. The method of claim 1, further comprising stripping the portion of the optical fiber in a fiber stripper attached to the body to remove coating from the portion of the optical fiber before creating the flaw in the portion of the optical fiber.

8. The method of claim 7, wherein the stripping is comprised of translating the fiber stripper about a guide surface disposed in the body.

9. The method of claim 1, further comprising bending the portion of the optical fiber along a guide surface disposed in the body before creating the flaw in the portion of the optical fiber using the abrasive medium.

10. The method of claim 1, wherein disposing the abrasive medium in the abrasive medium structure further comprises extending a portion of the abrasive medium outside of the abrasive medium structure.

11. A bladeless cleaver for cleaving an optical fiber, comprising:
   a body;
   a guide surface disposed in the body to guide a portion of the optical fiber; and
   a cleaver structure attached to the body and comprising an abrasive medium structure configured to support an abrasive medium;
   wherein the cleaver structure further comprises an actuator configured to actuate with respect to the body to place the abrasive medium in contact with the portion of the optical fiber to create a flaw in the portion of the optical fiber.

12. The bladeless cleaver of claim 11, wherein the actuator is spring-loaded.

13. The bladeless cleaver of claim 11, wherein the actuator is configured to actuate towards the guide surface.

14. The bladeless cleaver of claim 11, wherein the abrasive medium structure is configured to allow a portion of the abrasive medium to extend beyond the actuator towards the body.

15. The bladeless cleaver of claim 11, wherein the abrasive medium structure is comprised of an abrasive medium compartment.

16. The bladeless cleaver of claim 15, wherein the abrasive medium compartment comprises an opening configured to expose at least a portion of the abrasive medium adjacent to the guide surface.

17. The bladeless cleaver of claim 15, wherein the opening does not extend all the way through the cleaver structure.

18. The bladeless cleaver of claim 11, wherein the abrasive medium structure is disposed at an angle with respect to a tangent plane of the guide surface.

19. The bladeless cleaver of claim 11, further comprising a clamp attached to the body to create a stress in the portion of the optical fiber.

20. The bladeless cleaver of claim 11, further comprising a fiber stripper attached to the body to strip coating from the portion of the optical fiber.

21. The bladeless cleaver of claim 20, further comprising a clamp disposed in the fiber stripper to secure the fiber stripper to the portion of the optical fiber.

22. The bladeless cleaver of claim 20, wherein the fiber stripper is disposed in a track disposed in the guide surface of the body to allow the fiber stripper to be translated about the guide surface to strip the portion of the optical fiber.

23. The bladeless cleaver of claim 11, wherein the guide surface comprises an arcuate surface to bend the portion of the optical fiber.

24. The bladeless cleaver of claim 11, wherein the abrasive medium is disposed on a carrier.

25. The bladeless cleaver of claim 24, wherein the carrier is flexible.

26. The bladeless cleaver of claim 24, wherein the abrasive medium is disposed on the carrier in sizes between five (5) micrometers (μm) and twenty (20) micrometers (μm).

27. The bladeless cleaver of claim 24, wherein the carrier is comprised from the group consisting of a film, a wire, a string, a block, and a body.

28. A fiber optic package, comprising:
   an enclosure having a plurality of compartments each configured to hold a fiber optic component;
   a cleaver disposed in one of the plurality of compartments, wherein the cleaver includes a guide surface configured to guide a portion of an optical fiber; and
   an opening disposed through the enclosure and aligned with at least a portion of the guide surface and configured to receive the portion of the optical fiber and dispose the portion of the optical fiber along the guide surface.

29. The fiber optic package of claim 28, wherein the portion of the optical fiber disposed through the opening aligns the portion of the optical fiber with a first end of the guide surface.

30. The fiber optic package of claim 28, further comprising a fiber stop disposed in the one of the plurality of compartments containing the cleaver adjacent to a second end of the guide surface.

31. The fiber optic package of claim 28, wherein the cleaver comprises an abrasive medium structure configured to support an abrasive medium.

32. The fiber optic package of claim 31, wherein the cleaver is configured to place the abrasive medium in contact with the portion of the optical fiber disposed through the opening to create a flaw in the portion of the optical fiber.

33. The fiber optic package of claim 31, wherein the cleaver comprises an actuator configured to be actuated to place the abrasive medium in contact with the portion of the optical fiber.

34. The fiber optic package of claim 31, wherein the cleaver comprises a clamp to secure the portion of the optical fiber.

35. The fiber optic package of claim 34, wherein the clamp creates a stress in the portion of the optical fiber.

36. The fiber optic package of claim 31, wherein the cleaver comprises a fiber stripper to strip coating from the portion of the optical fiber.

* * * * *